(12) United States Patent
Hagi et al.

(10) Patent No.: US 9,941,677 B2
(45) Date of Patent: Apr. 10, 2018

(54) ELECTRICAL WIRE GUIDE

(71) Applicant: Sumitomo Wiring Systems, Ltd., Yokkaichi, Mie (JP)

(72) Inventors: Masahiro Hagi, Mie (JP); Hiroshi Inoue, Mie (JP); Yoshihiro Maeda, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/296,591

(22) Filed: Oct. 18, 2016

(65) Prior Publication Data
US 2017/0117691 A1 Apr. 27, 2017

(30) Foreign Application Priority Data
Oct. 23, 2015 (JP) .................................. 2015-208543

(51) Int. Cl.
*H02G 3/04* (2006.01)
*H02G 1/06* (2006.01)
*B60R 16/02* (2006.01)
*H02G 11/00* (2006.01)

(52) U.S. Cl.
CPC ........... *H02G 3/04* (2013.01); *B60R 16/0215* (2013.01); *H02G 1/06* (2013.01); *H02G 3/0475* (2013.01); *H02G 11/00* (2013.01)

(58) Field of Classification Search
None
See application file for complete search history.

(56) References Cited

U.S. PATENT DOCUMENTS

| | | | | | |
|---|---|---|---|---|---|
| 3,664,619 | A | * | 5/1972 | Heidrich | ................. F16G 13/16 248/51 |
| 3,782,670 | A | * | 1/1974 | Kielma | .................... F16G 13/16 248/51 |
| 4,625,507 | A | * | 12/1986 | Moritz | .................... F16G 13/16 248/51 |
| 5,987,873 | A | * | 11/1999 | Blase | ...................... F16G 13/16 248/49 |
| 6,161,372 | A | * | 12/2000 | Wehler | .................... F16G 13/16 249/49 |
| 6,688,096 | B2 | * | 2/2004 | Wada | ....................... F16G 13/16 248/49 |
| 7,484,351 | B2 | * | 2/2009 | Harada | ................ B25J 19/0025 248/49 |

(Continued)

FOREIGN PATENT DOCUMENTS

JP 2014068419 A 4/2014

*Primary Examiner* — Dimary Lopez Cruz
(74) *Attorney, Agent, or Firm* — Reising Ethington, P.C.

(57) ABSTRACT

An electrical wire guide including a plurality of link members that are lined up along one direction, and are coupled together so as to be rotatable relative to each other. The link members are respectively provided with: through holes that extend in an intersection direction intersecting a direction in which the link members are lined up; and lock protrusions that are each provided with a claw that is locked to a peripheral portion around the corresponding through hole and protrudes in the intersection direction. The lock protrusions of the plurality of link members protrude in the same direction. The link members are coupled together by the lock protrusions being locked to the through holes.

6 Claims, 13 Drawing Sheets

(56) References Cited

U.S. PATENT DOCUMENTS 7,591,128 B2 * 9/2009 Komiya .................. F16G 13/16
                                                  248/49
8,343,154 B2 * 1/2013 Long ...................... A61B 17/80
                                                  606/286

* cited by examiner

ELECTRICAL WIRE GUIDE

This application claims the benefit of Japanese Application No. JP2015-208543, filed on Oct. 23, 2015, the contents of which are hereby incorporated by reference in their entirety.

FIELD

The present invention relates to an electrical wire guide.

BACKGROUND

There are conventionally known electrical wire guides that guide the movement of an electrical wire that is repeatedly subjected to a predetermined bending operation, such as an electrical wire routed between a vehicle body and a sliding door. Examples of such electrical wire guides include an electrical wire guide in which a plurality of link members are lined up along one direction, and the link members are coupled together so as to be rotatable relative to each other, as disclosed in JP 2014-68419A. Each link member of such an electrical wire guide has a pair of coupling plates that face each other in a top-bottom direction. A bearing hole is formed in one end portion of each link member, and a support shaft protrudes from the other end portion. Adjacent link members are pressed in the direction in which they are lined up, and are fitted together such that end portions of coupling plates overlap each other. Thus, the support shafts are fitted into and supported by the bearing holes, and the link members are coupled together so as to be rotatable relative to each other. This electrical wire guide is assembled by sequentially fitting the plurality of link members together in the direction in which the link members are lined up.

SUMMARY

With the electrical wire guide having the above-described configuration, it is difficult to fit the plurality of link members together all at once. This is because, in order to fit all the plurality of lined up link members together at once, it is necessary to concentrate the force that fits adjacent link members together (i.e. pressure in the direction in which the link members are lined up) to one link member that is located at an end in the direction in which the link members are lined up. In order to fit a large number of link members that constitute an elongated electrical wire guide together all at once, it is necessary to apply a great amount of force to the link member located at the end.

The present design has been made in view of the above-described situation, and aims to provide an electrical wire guide that allows a plurality of link members to be easily fitted together all at once.

An electrical wire guide according to one aspect is an electrical wire guide including a plurality of link members that are lined up along one direction, and are coupled together so as to be rotatable relative to each other. The link members are respectively provided with: through holes that extend in an intersection direction intersecting a direction in which the link members are lined up; and lock protrusions that are each provided with a claw that is locked to a peripheral portion around the corresponding through hole and protrudes in the intersection direction. The lock protrusions of the plurality of link members protrude in the same direction. The link members are coupled together by the lock protrusions being locked to the through holes.

According to this aspect, it is possible to couple adjacent link members with each other by pressing the link members in a direction intersecting the direction in which the link members are lined up, and it is possible to easily fit the plurality of link members together all at once.

DRAWINGS

DESCRIPTION

The following describes preferred embodiments.

In the electrical wire guide according to an aspect, the lock protrusions may be configured to be elastically deformed when passing through the through holes, and the link members may be respectively provided with angle limiters that are configured to come into contact with the lock protrusions in a direction intersecting a direction in which the lock protrusions are elastically deformed, and to limit a rotation angle of adjacent link members relative to each other to a predetermined angle. With such a configuration, the lock protrusions are not deformed when being brought into contact with the angle limiters, and it is possible to limit the rotation angle of the link members by using the lock protrusions.

In the electrical wire guide according to another aspect, the angle limiters may include first angle limiters that protrude from coupling plates in which the through holes are respectively formed, in the same direction as a direction in which the lock protrusions protrude.

In the electrical wire guide according to this aspect, the angle limiters may include second angle limiters that are respectively formed on inner circumferential surfaces of the through holes.

In the electrical wire guide according to another aspect, the link members may respectively have electrical wire holders in which an electrical wire is housed and held, and the electrical wire holders may be respectively provided with openings that are configured to house the electrical wire inserted from a direction intersecting the direction in which the link members are lined up. With such a configuration, the electrical wire holders can house the electrical wire inserted from a direction intersecting the direction in which the link members are lined up, and it is unnecessary to perform the task of passing the electrical wire in the direction in which the link members are lined up.

In the electrical wire guide according to another aspect, the electrical wire holders may be hook-shaped and made of rod-shaped members. With such a configuration, the link members can be reduced in weight.

The following describes an embodiment in detail with reference to FIGS. 1 to 13.

Figure 1:
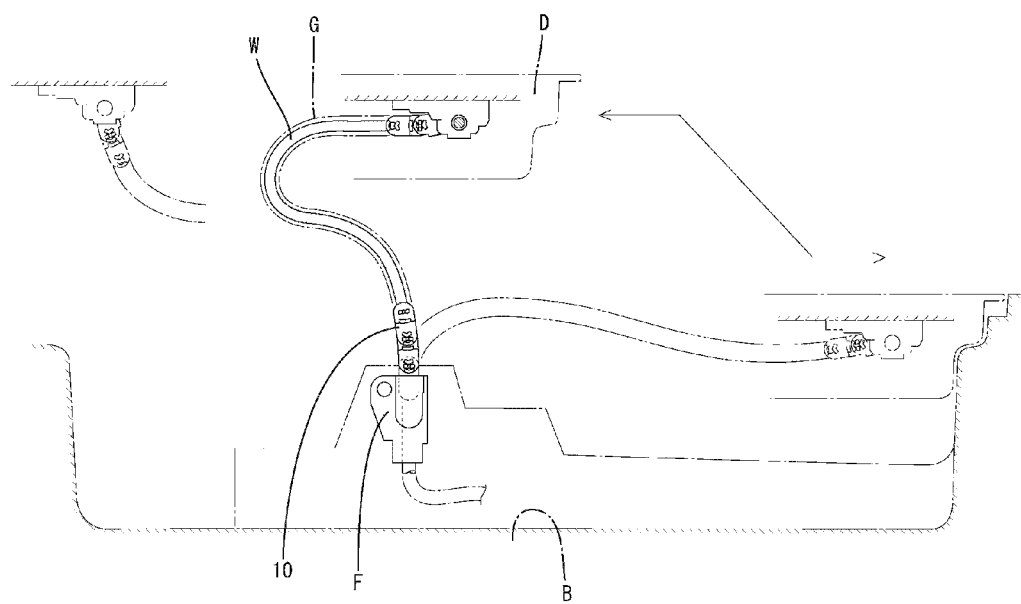
FIG. 1 is a schematic view showing the operation of an electrical wire guide according to an embodiment.
Figure 2:
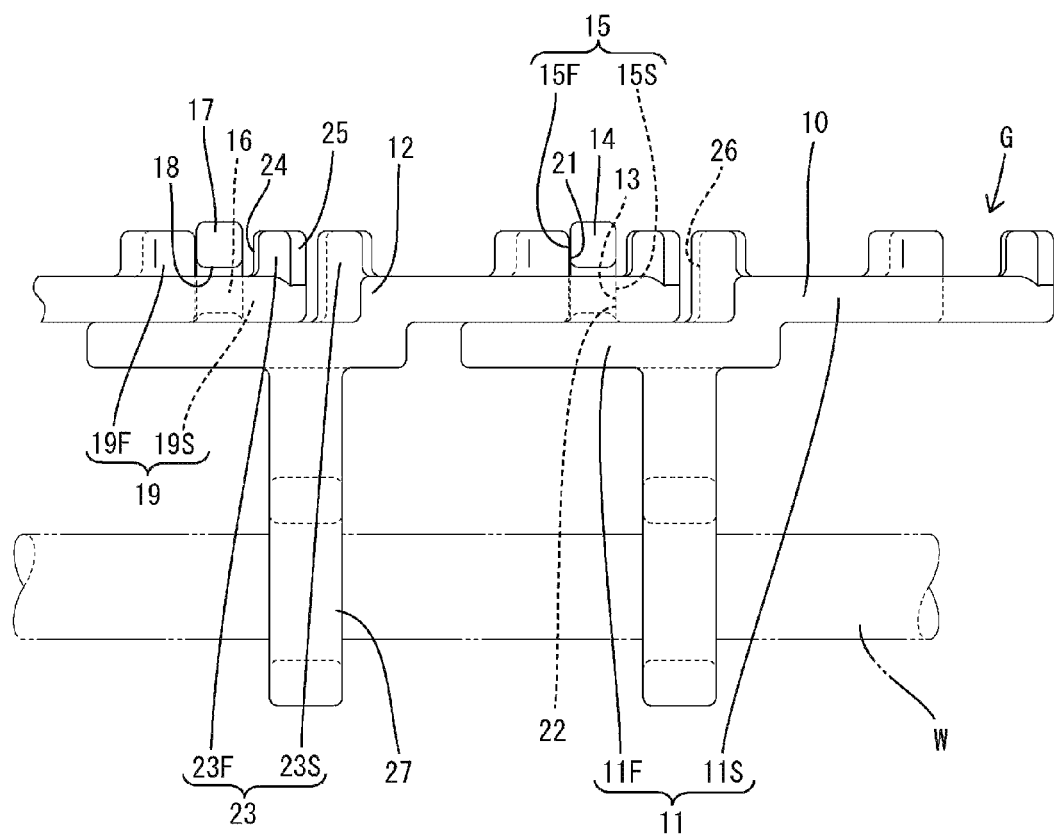
FIG. 2 is a side view showing a portion of the electrical wire guide.

As shown in FIG. 1, an electrical wire guide G according to the present embodiment is provided between a vehicle body (the body of a vehicle) B and a sliding door D that is movable relative to the vehicle body B. The electrical wire guide G is configured to be bendable into a predetermined shape in response to the sliding door D being opened or closed. The end portions of the electrical wire guide G in the longitudinal direction are respectively fixed to fixing brackets F that are provided on the vehicle body B and the sliding door D. In the following description, in each of the constituent members, the direction toward the upper side when the electrical wire guide G is installed to the vehicle (the upward direction in FIG. 2) is defined as the upward direction, and the direction toward the lower side is defined as the downward direction.

The electrical wire guide G includes a plurality of link members 10 that are lined up along one direction and are coupled together so as to be rotatable relative to each other.

Figure 3:
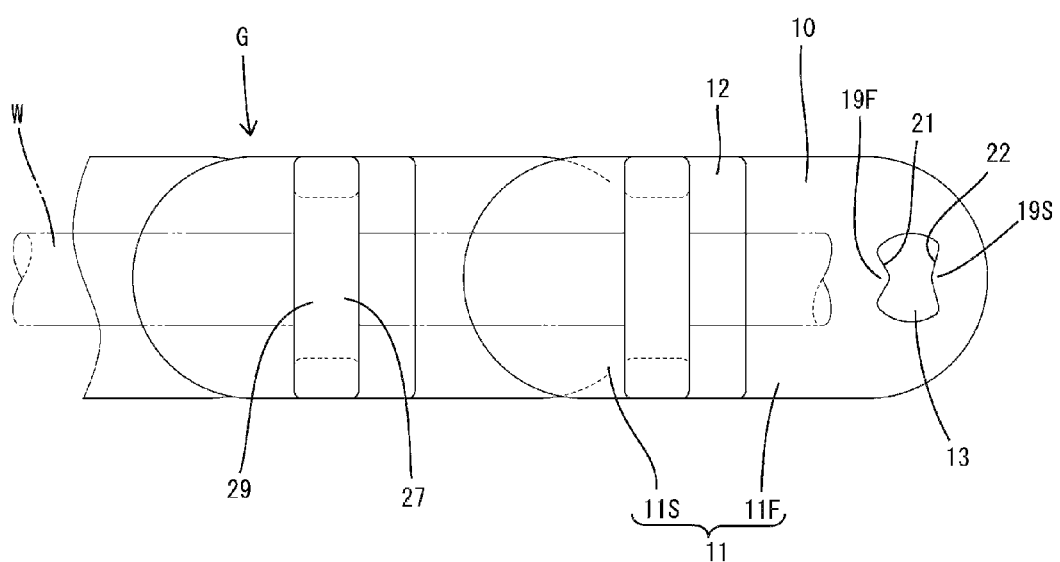
FIG. 3 is a bottom view showing a portion of the electrical wire guide.
Figure 4:
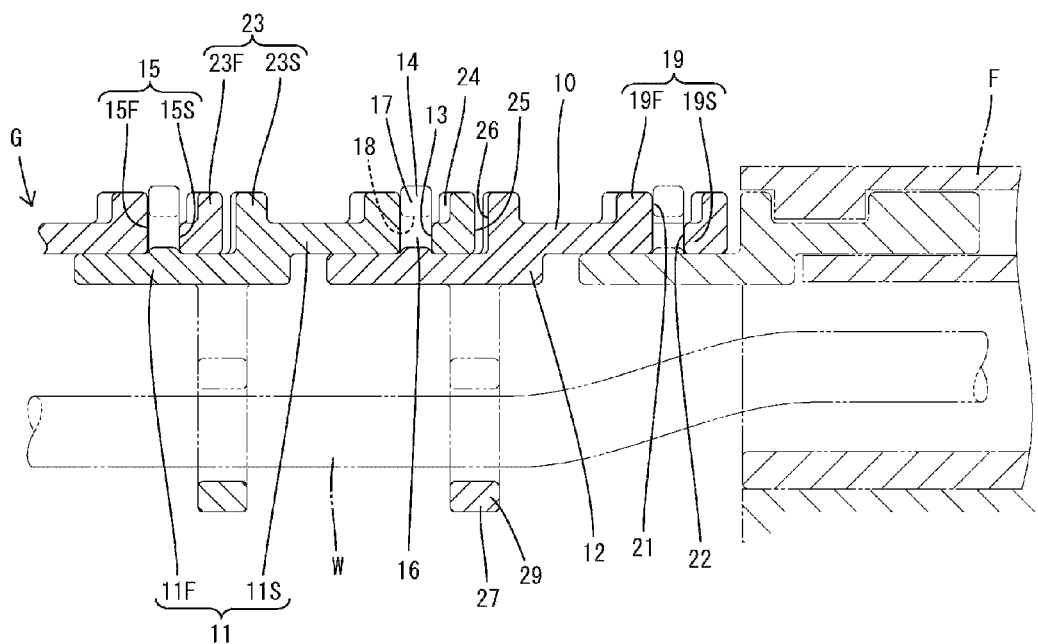
FIG. 4 is a cross-sectional view showing a portion of the electrical wire guide.

Each link member 10 is made of synthetic resin, and, as shown in FIG. 3, includes a coupling plate 11 that has an approximately oval plate shape that is elongated in the direction in which the link members 10 are lined up (the coupling direction). As shown in FIG. 4, the coupling plate 11 is provided with a step portion 12 in a central portion in the longitudinal direction so that one end portion of the coupling plate 11 in the longitudinal direction is located higher than the other end portion. In the following description, an approximately half portion on the upper side of the coupling plate 11 is referred to as "first coupling plate portion 11F", and an approximately half portion on the lower side is referred to as "second coupling plate portion 11S".

The coupling plate 11 of each link member 10 is provided with a through hole 13 that penetrates in a top-bottom direction (a direction intersecting the direction in which the link members 10 are lined up) and a lock protrusion 14 that can be locked to the through hole 13 (see FIG. 4).

As shown in FIG. 3, the through hole 13 is provided in a central portion, in the width direction (lateral direction), of the coupling plate 11 (the first coupling plate portion 11F). The through hole 13 is located closer to the end portion that is opposite the step portion 12, of the first coupling plate portion 11F. The through hole 13 is elongated in the width direction of the coupling plate 11, and its end portions in the lengthwise direction each have a circular arc shape.

Figure 5:
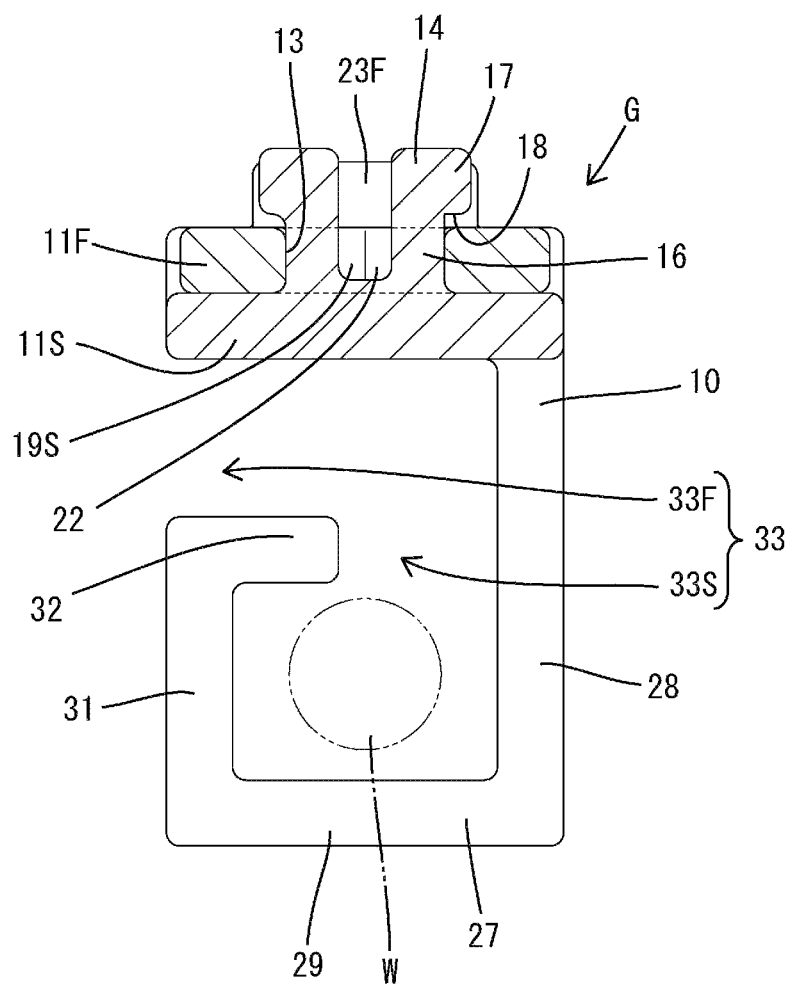
FIG. 5 is a cross-sectional view showing a lock structure of the electrical wire guide.
Figure 6:
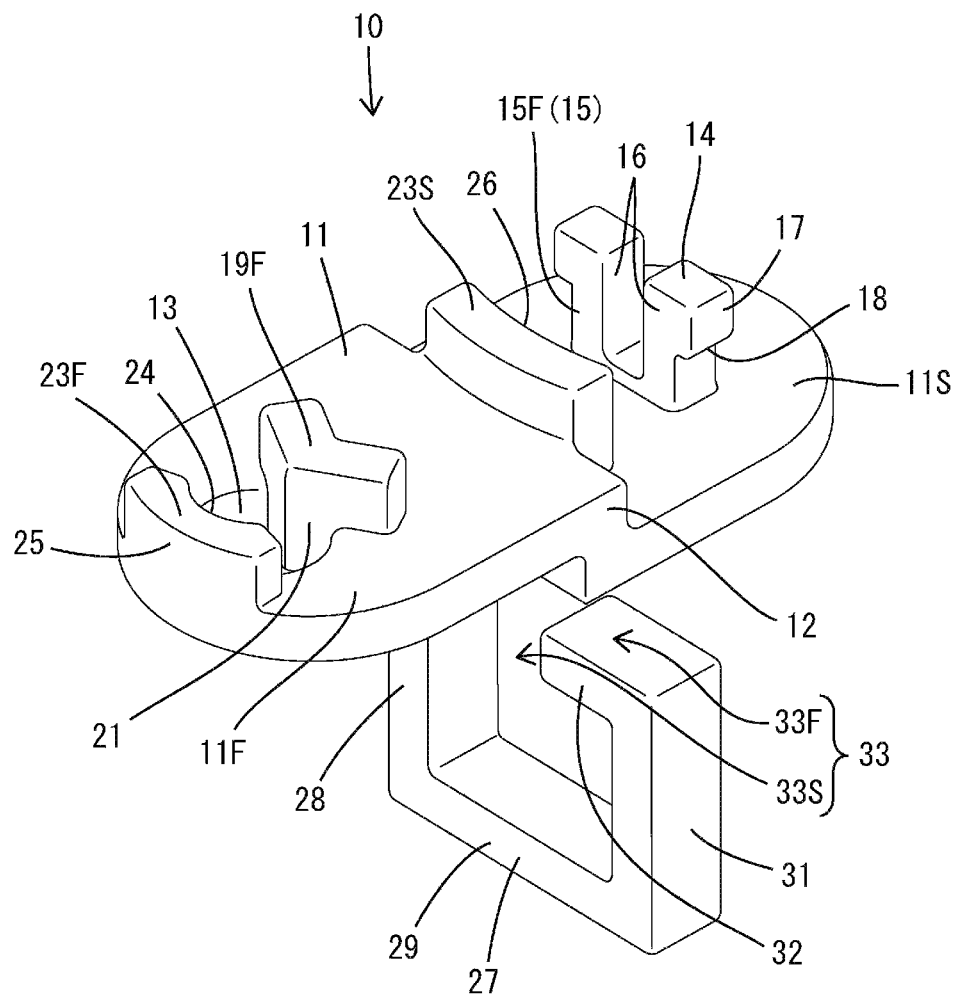
FIG. 6 is a perspective view showing a link member.

As shown in FIG. 5, the lock protrusion 14 protrudes from the upper surface of a central portion, in the width direction, of the coupling plate 11 (the second coupling plate portion 11S). The lock protrusion 14, when seen as a whole, protrudes upward (in an intersecting direction) from the coupling plate 11 in a cantilever-like shape, and is configured to be elastically deformable when passing through the through hole 13.

Figure 9:
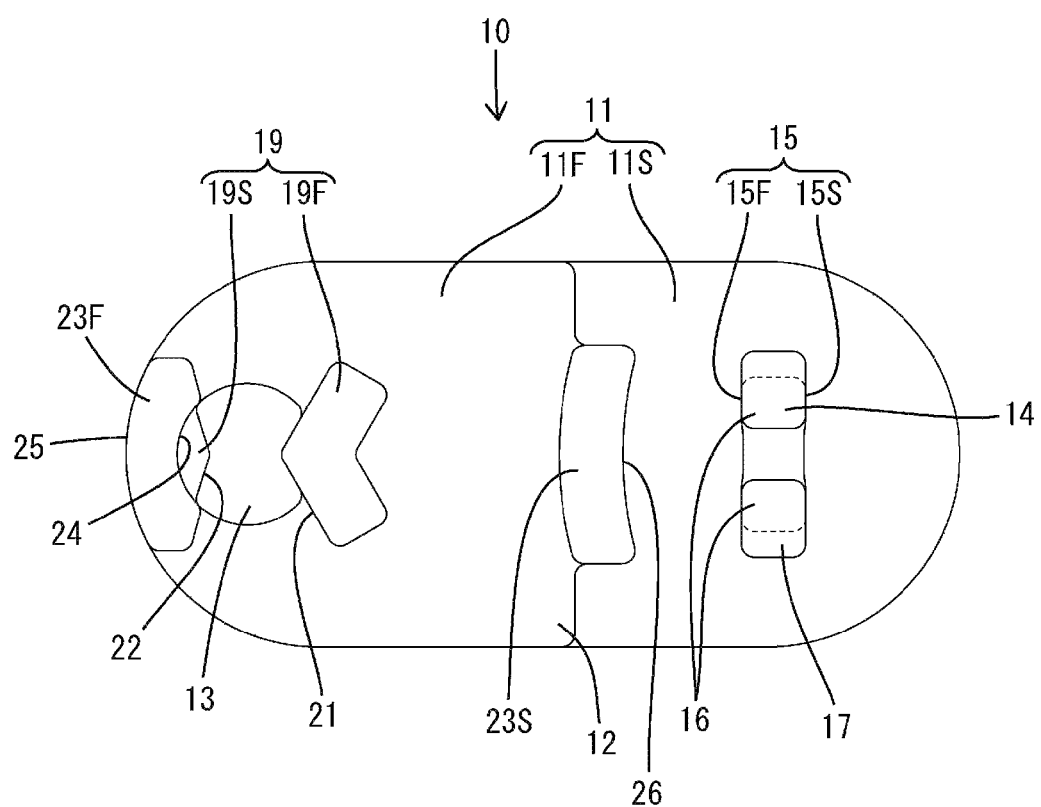
FIG. 9 is a plan view showing the link member.
Figure 10:
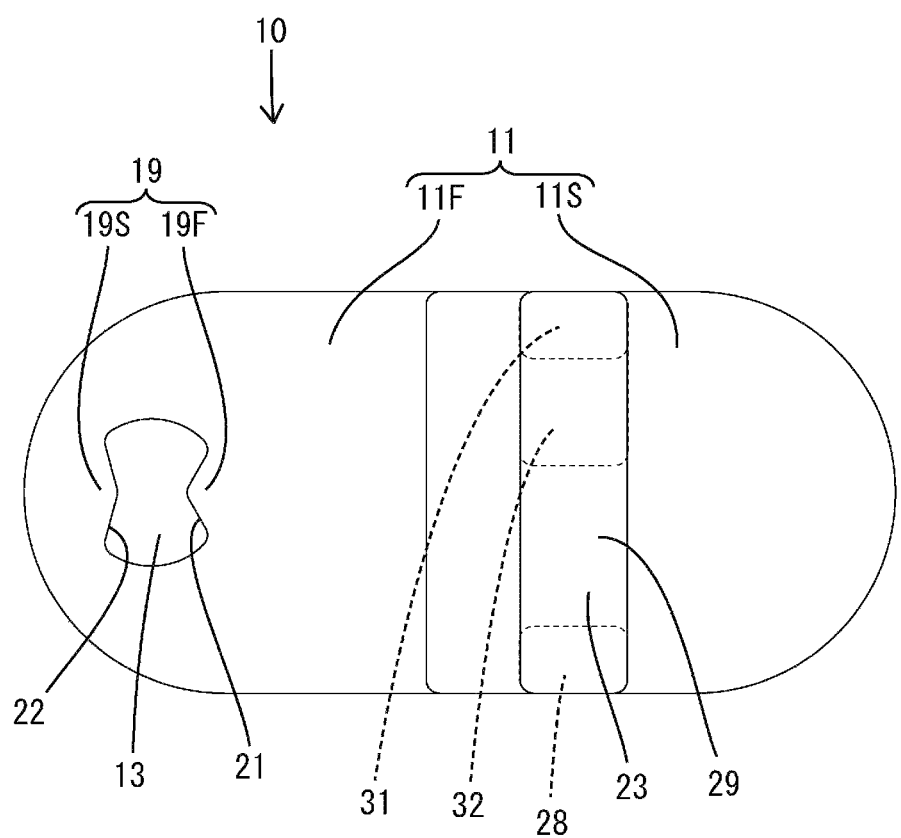
FIG. 10 is a bottom view showing the link member.

The lock protrusion 14 is located in a central portion, in the longitudinal direction, of the second coupling plate portion 11S (see FIG. 9). The lock protrusion 14, when seen as a whole, has the shape of a wall that is elongated in the width direction of the link members 10. The end surfaces of the lock protrusion 14 in the lateral direction (the left and right side surfaces in FIG. 9) are configured as receiving surfaces 15, with which angle limiters 19, which will be described later, can be brought into contact. The receiving surfaces 15 are configured as flat surfaces that stand upright at a right angle relative to the upper surface of the coupling plate 11. Out of the receiving surfaces 15, the surface on the side of step portion 12 is a first receiving surface 15F with which a first angle limiter 19F, which will be described later, can be brought into contact, and the surface on the side opposite the step portion 12 is a second receiving surface 15S with which a second angle limiter 19S, which will be described later, can be brought into contact.

Figure 7:
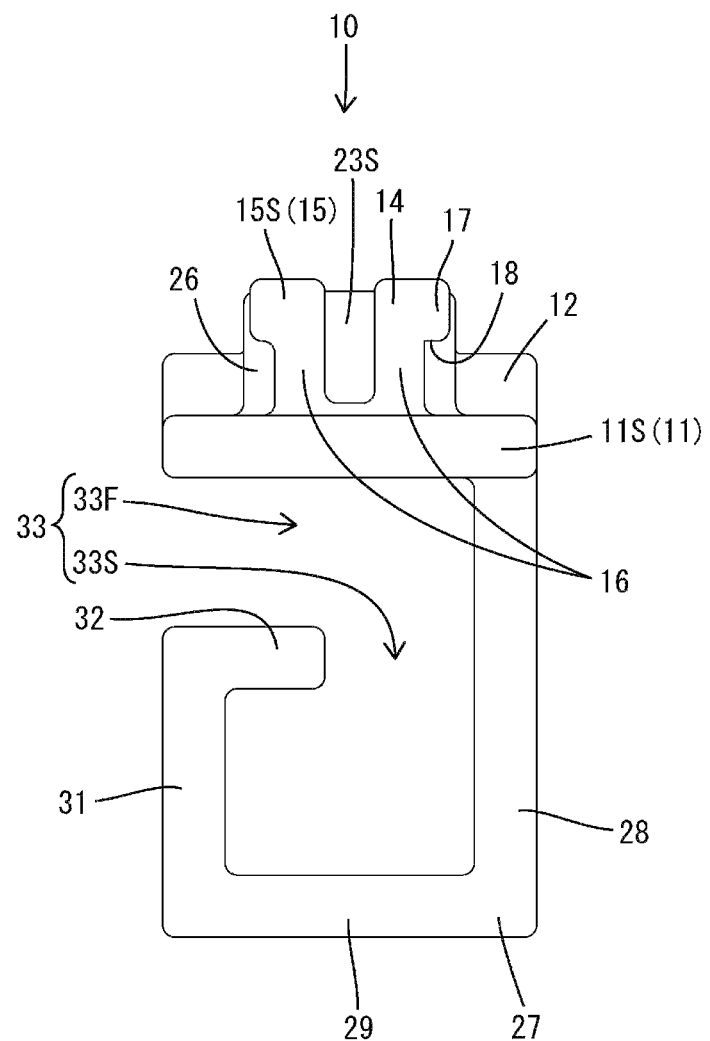
FIG. 7 is a front view showing the link member.
Figure 8:
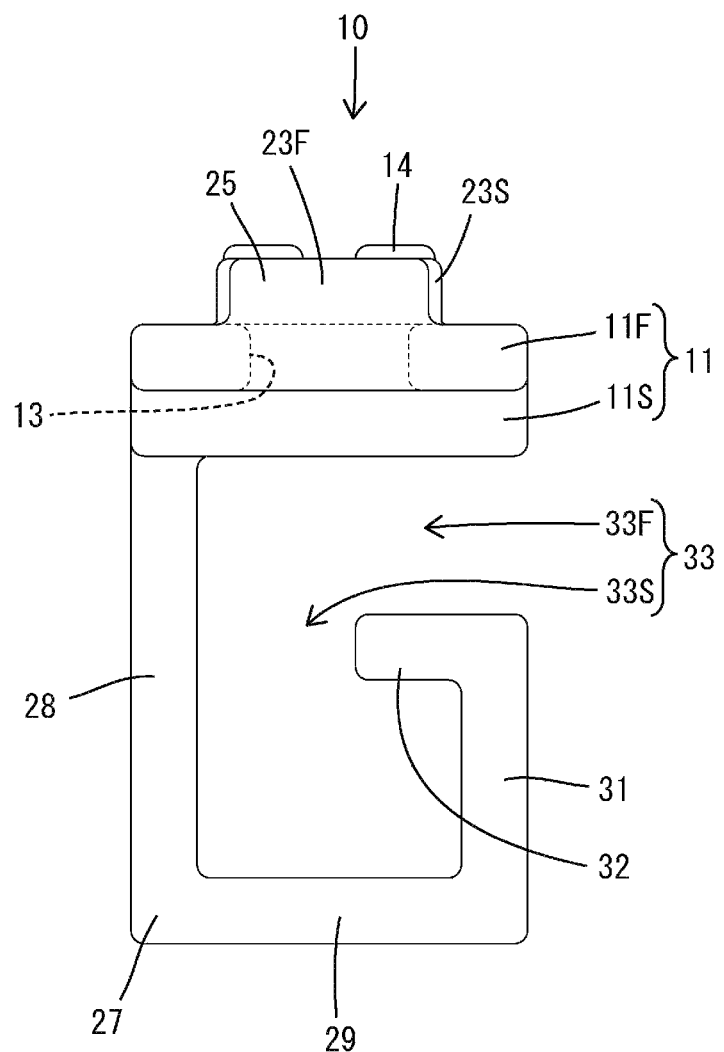
FIG. 8 is a rear view showing the link member.

As shown in FIG. 7, the lock protrusion 14 includes a pair of legs 16 that stand upright facing each other in the width direction. Each leg 16 has a cantilever-like shape whose upper end is a free end. Each leg 16 has a columnar shape with an approximately rectangular cross section. The pair of legs 16 are symmetrical in the width direction of the link members 10. The pair of legs 16 are configured to be elastically deformable toward the inside (in the directions in which they face each other).

A tip portion of each leg 16 is provided with a claw 17 that is locked to a peripheral portion around the through hole 13.

The claws 17 protrude outward from the legs 16. The lower surface of each claw 17 is configured as a lock surface 18 that is locked to the peripheral portion around the through hole 13 and that is approximately orthogonal to the top-bottom direction.

Figure 12:
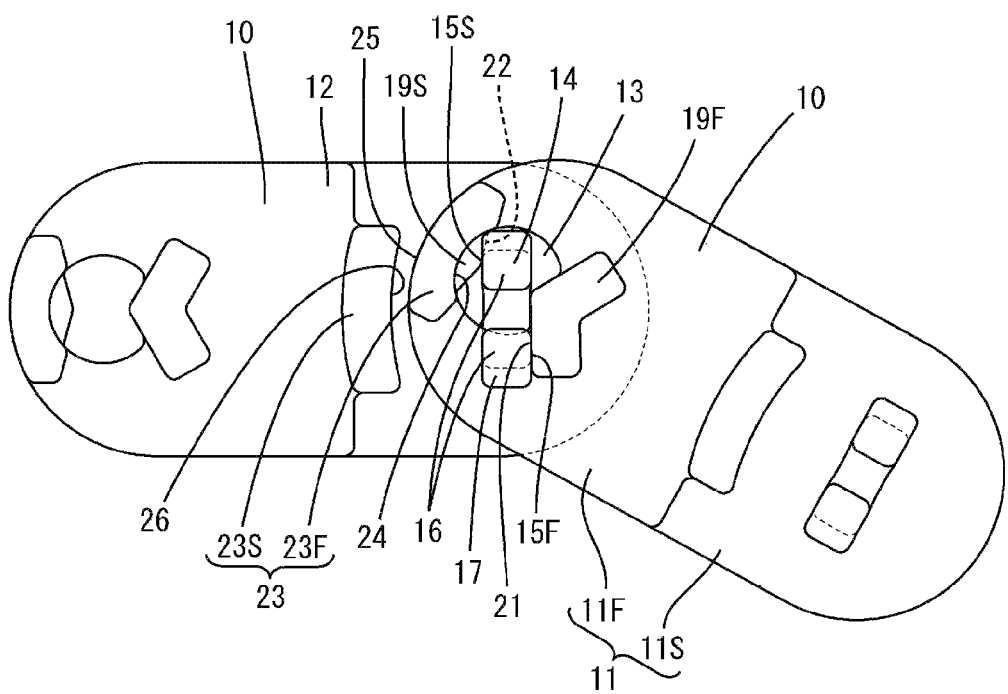
FIG. 12 is a plan view showing a rotational operation of adjacent link members.
Figure 13:
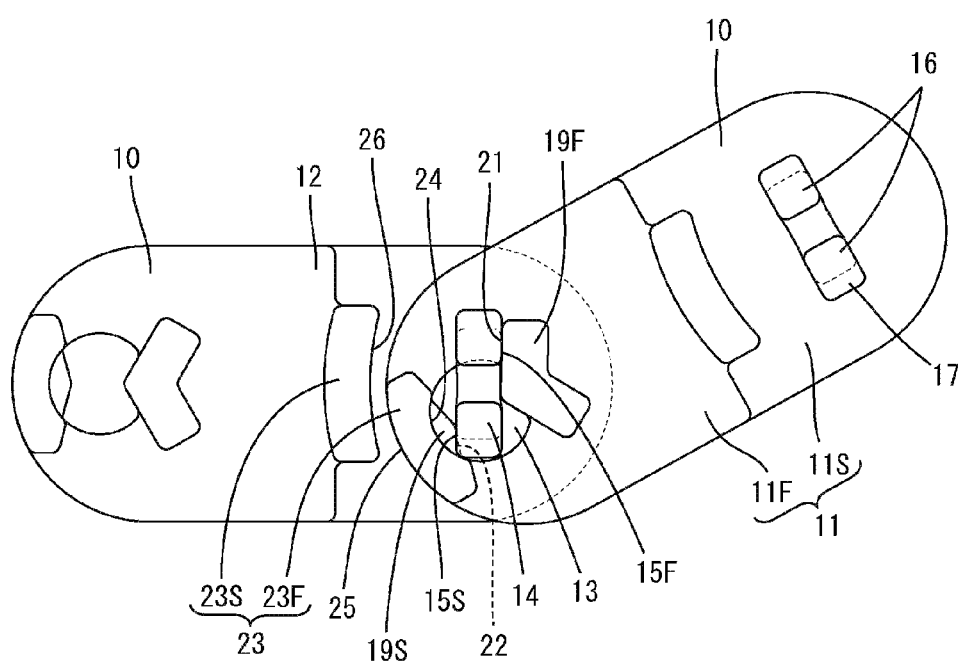
FIG. 13 is a plan view showing a rotational operation of adjacent link members in the direction opposite the direction shown in FIG. 12.

The link members 10 are provided with pairs of guides 23 that guide rotational operations of adjacent link members 10 relative to each other (see FIGS. 12 and 13). Each pair of guides 23 includes a first guide 23F that protrudes from the upper surface of the first coupling plate portion 11F and a second guide 23S that protrudes from the upper surface of the second coupling plate portion 11S.

As shown in FIG. 9, the first guide 23F is provided along an end edge, in the lengthwise direction, of the link member 10. The surface that faces the through hole 13 (hereinafter referred to as "inner surface 24"), of the first guide 23F is curved in the shape of a circular arc that is concentric with the through hole 13. The surface opposite the inner surface 24 (hereinafter referred to as "outer surface 25"), of the first guide 23F is curved in the shape of a circular arc along an end surface of the link member 10.

The second guide 23S protrudes from a central portion, in the width direction, of the link member 10 along the step portion 12. The width of the second guide 23S is slightly greater than the respective widths of the first guide 23F, the first angle limiter 19F, and the lock protrusion 14. The surface of the second guide 23S that is on the side of the second coupling plate portion 11S is configured as a curved surface 26 that is curved along the outer surface 25 of the first guide 23F.

The link members 10 are provided with pairs of angle limiters 19 that limit the rotation angle of adjacent link members 10 relative to each other to a predetermined angle (see FIGS. 12 and 13). Each pair of angle limiters 19 is brought into contact with (abuts against) the corresponding lock protrusion 14 in the lengthwise direction of the link members 10 (a direction intersecting the direction of elastic deformation). Each pair of angle limiters 19 is provided in a central portion, with respect to the width direction, of the corresponding link member 10. Each pair of angle limiters 19 is provided along the lengthwise direction of the link members 10 with the through hole 13 between the angle limiters 19.

Figure 11:
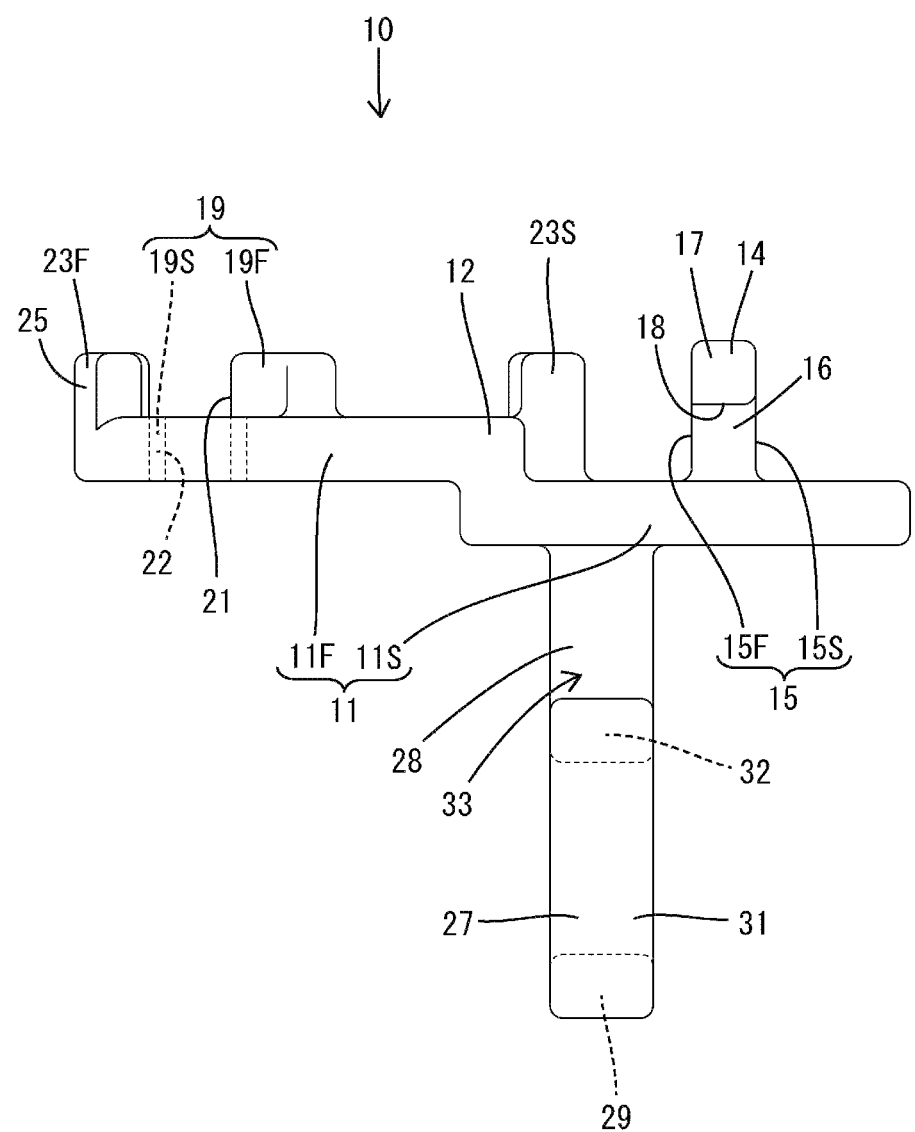
FIG. 11 is a side view showing the link member.

Out of a pair of angle limiters 19, the angle limiter on the side of the center of the corresponding link member 10 in the lengthwise direction (hereinafter referred to as "first angle limiter 19F") protrudes from the upper surface of the first coupling plate portion 11F. The first angle limiter 19F has the shape of a wall that stands upright approximately perpendicular to the upper surface of the first coupling plate portion 11F. As shown in FIG. 11, the height of the protruding end of the first angle limiter 19F is approximately the same as the heights of the respective protruding ends of the lock protrusion 14, the first guide 23F, and the second guide 23S.

When seen from above, the first angle limiter 19F is V-shaped as shown in FIG. 9. The surface on the side of the through hole 13, of the first angle limiter 19F is configured as a first contact surface 21 that is brought into contact with the lock protrusion 14 when the adjacent link members 10 forms a predetermined relative angle. The first contact surface 21 includes two inclined surfaces, and these surfaces are inclined such that the first angle limiter 19F extends toward the center side in the lengthwise direction of the link member 10, when following the angle limiter 19 from the center to an end, in the width direction. The first contact surface 21 reaches the inner circumferential surface of the through hole 13, and the apex of the first contact surface 21 (the boundary between the two inclined surfaces) protrudes to narrow the width of the through hole 13. The first contact surface 21 is formed along the entire plate thickness direction (the top-bottom direction) of the first coupling plate portion 11F. The two inclined surfaces of the first contact surface 21 each have a width that is sufficient for the inclined surfaces to be brought into contact with the entirety (the entire length in the height direction and the width direction) of one leg 16 including the claw 17 (see FIG. 12).

Out of one pair of angle limiters 19, the angle limiter located on the side of an end of the link member 10 in the lengthwise direction (hereinafter referred to as "second angle limiter 19S") is formed on the inner circumferential surface of the through hole 13 as shown in FIG. 9. The second angle limiter 19S protrudes inward of the through hole 13, and its protruding end surface is configured as a second contact surface 22 that is brought into contact with the lock protrusion 14 when adjacent link members 10 form a predetermined relative angle. As with the first contact surface 21, the second contact surface 22 includes two inclined surfaces, and these surfaces are inclined such that the second angle limiter 19S extends toward an end side in the lengthwise direction of the link member 10, when following the second angle limiter 19S from the center to an end, in the width direction. The second contact surface 22 faces the first contact surface 21 in the lengthwise direction of the link members 10. The second contact surface 22 is formed along the entire length of the through hole 13 in the insertion direction. The second contact surface 22 is configured to be able to be brought into contact with portions other than the claws 17, of the legs 16 of the lock protrusion 14.

It is possible to freely set the limited angle of the link members 10 by changing the inclination of the first contact surface 21 or the second contact surface 22.

As shown in FIG. 5, the link member 10 includes an electrical wire holder 27 that encloses and holds a wire harness (electrical wire) W that feeds power to electrical components (not shown) within the sliding door D. When seen as a whole, the electrical wire holder 27 is hook-shaped, and is formed integrally with a central portion of the link member 10 in the longitudinal direction. The link member 10 is reduced in weight due to the electrical wire holder 27 being hook-shaped.

The electrical wire holder 27 is formed from a rod-shaped member and has an approximately rectangular shape that encloses the outer circumferential surface side of the wire harness W. Specifically, the electrical wire holder 27 includes: a first vertical portion 28 that extends downward from the lower surface of the second coupling plate portion 11S; a first horizontal portion 29 that extends approximately horizontally from the lower end of the first vertical portion 28; a second vertical portion 31 that extends upward from an end portion of the first horizontal portion 29; and a second horizontal portion 32 that extends approximately horizontally toward the first vertical portion 28 from the upper end of the second vertical portion 31.

The first vertical portion 28 extends approximately vertically downward from an end portion, with respect to the width direction, of the coupling plate 11. The first horizontal portion 29 has a length that is approximately the same as the width of the coupling plate 11. The second vertical portion 31 is configured to have approximately half the length of the first vertical portion 28. The second horizontal portion 32 is configured to have approximately half the length of the first horizontal portion 29.

The electrical wire holder 27 is provided with an opening 33 that is configured to house the wire harness W inserted from a side of the link member 10 (in a direction intersecting the direction in which the link members 10 are lined up). The opening 33 is in communication with the inside and the outside of the electrical wire holder 27. The opening 33 includes: a first opening portion 33F that is open between the coupling plate 11 and the second horizontal portion 32 in the width direction (horizontal direction); and a second opening portion 33S that is open in the top-bottom direction (vertical direction) between the tip of the second horizontal portion 32 and the first vertical portion 28. The wire harness W passes through the first opening portion 33F and the second opening portion 33S in this order, and can thus be housed within the electrical wire holder 27 (below the second horizontal portion 32).

Next, an example of how to assemble the electrical wire guide G according to the present embodiment is described.

First, all the link members 10 constituting the electrical wire guide G are lined up in a row. Here, the link members 10 are arranged such that the first coupling plate portion 11F of one link member 10 out of each pair of adjacent link members 10 is located above the second coupling plate portion 11S of the other link member 10, and the through hole 13 and the lock protrusion 14 are aligned in the top-bottom direction. The coupling plates 11 of the link members 10 that are thus lined up are displaced upward one after another from the end by at least the protrusion length of the lock protrusions 14.

Next, pressure is applied such that a downward force is applied to the fitting portions of all the link members 10. Consequently, the through hole 13 and the lock protrusion 14 of adjacent link members 10 are fitted together one after another from the end, and ultimately the fitting of all the link members 10 is completed. In this regard, in the fitting portion of each link member 10, the claws 17 of the lock protrusion 14 are brought into contact with a peripheral portion around the through hole 13 and the legs 16 are elastically deformed inward of the through hole 13. Upon the through hole 13 having been moved and positioned below the claws 17, the legs 16 elastically restore their original shape, and thus the claws 17 are locked to the upper surface side of the peripheral portion around the through hole 13. In this way, the link members 10 are coupled together all at once. At this time, the coupling plates 11 of all the link members 10 are aligned in terms of the height, i.e., the electrical wire guide G extends in the horizontal direction.

As shown in FIGS. 12 and 13, the link members 10 coupled together are configured to be rotatable relative to one another. Specifically, adjacent link members 10 rotate such that the outer surface 25 of the first guide 23F and the curved surface 26 of the second guide 23S slide along each other. When the relative angle between adjacent link members 10 reaches a predetermined angle, one of the inclined surfaces included in the first contact surface 21 of the first angle limiter 19F abuts against the first receiving surface 15F of one leg 16 out of one pair of legs 16, and one of the inclined surfaces included in the second contact surface 22 of the second angle limiter 19S is brought into contact with the second receiving surface 15S of the other leg 16. Thus, further rotation of adjacent link members 10 is restricted. Note that when adjacent link members 10 rotate, the claws 17 of the lock protrusion 14 are displaced along the inner surface 24 of the first guide 23F.

Next, the wire harness W is held within the electrical wire guide G thus assembled. The wire harness W including an electrical wire, to which a connector and a terminal fitting (not shown) are attached at its terminal portion, is inserted via the opening 33 and is housed within the electrical wire holder 27. In this way, since it is possible to pass the wire harness W into the inside of the electrical wire holder 27 from the opening 33, it is therefore unnecessary to perform the task of passing the wire harness W in the lengthwise direction of the electrical wire guide G in a conventional manner. Therefore, when performing the task of passing the electrical wire, it is unnecessary to perform the task of protecting the terminal fitting connected to the terminal portion of the electrical wire using a protection tube or the like. Also, it is unnecessary to take into consideration design matters such as displacing the terminal fitting in the lengthwise direction by adjusting the length of the electrical wire in order to prevent the diameter of the wire harness from being large.

Thus, the task of assembling the electrical wire guide G is completed.

Next, the actions and the advantageous effects of the embodiment having the above-described configuration are described.

The electrical wire guide G according to the present embodiment includes a plurality of link members 10 that are lined up along one direction, and are coupled together so as to be rotatable relative to each other. The link members 10 are respectively provided with: through holes 13 that penetrate in a top-bottom direction; and lock protrusions 14 that are each provided with a claw 17 that is locked to a peripheral portion around the corresponding through hole 13 and protrudes upward. The link members 10 are coupled together by the lock protrusions 14 being locked to the through holes 13.

With this configuration, it is possible to couple the link members 10 together by pressing each fitting portion in the top-bottom direction. Therefore, it is possible to easily fit the plurality of link members 10 together all at once.

Also, the lock protrusions 14 are configured to be elastically deformed when passing through the through holes 13, and the link members 10 are respectively provided with angle limiters 19 that are in contact with the lock protrusions 14 in a direction intersecting a direction in which the lock protrusions 14 are elastically deformed, and that limit a rotation angle of adjacent link members 10 relative to each other to a predetermined angle. With such a configuration, the lock protrusions 14 are not deformed when being brought into contact with the angle limiters 19, and it is possible to limit the rotation angle of the link members 10 by using the lock protrusions 14.

The link members 10 respectively have electrical wire holders 27 in which a wire harness W is housed and held, and the electrical wire holders 27 are respectively provided with openings 33 that are configured to house the wire harness W inserted from the side. With this configuration, the electrical wire holder 27 can hold the wire harness W inserted sideways, and it is unnecessary to perform the task of passing the wire harness W in the direction in which the link members 10 are lined up.

The present invention is not limited to the embodiment that has been described above with reference to the drawings, and the following embodiments, for example, are included within the technical scope of the present invention.

In the above-described embodiment, each lock protrusion 14 has a pair of legs 16. However, such a configuration is not essential, and the number of legs of each lock protrusion may be only one or three or more.

In the above-described embodiment, the legs 16 of each lock protrusion 14 are deformed when passing through the corresponding through hole 13. However, such a configuration is not essential, and the claws of each lock protrusion may be deformed instead of the legs being deformed when passing through the corresponding through hole.

In the above-described embodiment, the link members 10 constituting the electrical wire guide G are coupled together all at once. However, this is not essential, and it is acceptable that sets of a plurality of link members constituting the electrical wire guide are first coupled together at once, and then the sets of link members are coupled together.

In the above-described embodiment, the angle limiters 19 are brought into contact with the lock protrusions 14. However, such a configuration is not essential, and the angle limiters may have a structure for limiting the angle by being brought into contact with parts other than the lock protrusions.

In the above-described embodiment, the electrical wire holders 27 are each provided with the opening 33. However, such a configuration is not essential. The electrical wire holders may each have a shape in which the entire periphery is closed.

In the above-described embodiment, the opening 33 of each electrical wire holder 27 is open sideways. However, such a configuration is not essential, and an opening that opens downward may be provided in the electrical wire holders.

In the above-described embodiment, the electrical wire holders 27 are each formed from a rod-shaped member. However, such a configuration is not essential, and the electrical wire holders may each be formed into an approximately box-like shape from wall-shaped members.

In the above-described embodiment, each coupling plate 11 is provided with the step portion 12 formed thereon. However, such a configuration is not essential, and the coupling plates may have an entirely flat shape without a step.

In the above-described embodiment, the electrical wire holders 27 are each provided below the corresponding coupling plate 11. However, such a configuration is not essential. For example, the electrical wire holders may be provided above the coupling plates. If this is the case, the lock protrusions may be provided on the lower surfaces of the coupling plates so as to extend downward.

In the above-described embodiment, the electrical wire holders 27 are each formed integrally with the corresponding coupling plate 11. However, such a configuration is not essential. For example, an electrical wire holder and a coupling plate may be formed separately, and integrated into one piece by assembly.

In the above-described embodiment, the angle limiters 19 include the first angle limiters 19F and the second angle limiters 19S. However, such a configuration is not essential, and it is also acceptable that either one kind of angle limiters is provided.

In the above-described embodiment, the respective first vertical portions 28 of the link members 10 extend downward by the same length. However, such a configuration is not essential, and the length by which the first vertical portion 28 extends downward may be varied depending on the position in the direction in which the link members are lined up.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electrical wire guide, comprising:
   a plurality of link members that are lined up along one direction, and are coupled together so as to be rotatable relative to each other;
   each of the plurality of link members includes: a through hole that penetrates the link member in an intersection direction intersecting a direction in which the link members are lined up, a pair of angle limiters that include a first angle limiter located on a first side of the through hole and a second angle limiter located on an opposite second side of the through hole, and a lock protrusion that protrudes from the link member in the intersecting direction and includes a plurality of elastically deformable legs, each of the legs includes a claw that is located at an end of the leg;
   wherein the lock protrusion of a first link member extends through the through hole of a second link member so that the legs and claws of the first link member lock to a peripheral portion around the through hole of the second link member, the first angle limiter located on the first side of the through hole contacts a first receiving surface of the legs so as to limit relative rotation between the first and second link members, and the second angle limiter located on the second side of the through hole contacts a second receiving surface of the legs so as to also limit relative rotation between the first and second link members.

2. The electrical wire guide according to claim 1,
   wherein the lock protrusions are configured to be elastically deformed when passing through the through holes; and
   the link members are respectively provided with angle limiters that are configured to come into contact with the lock protrusions in a direction intersecting a direction in which the lock protrusions are elastically deformed, and to limit a rotation angle of adjacent link members relative to each other to a predetermined angle.

3. The electrical wire guide according to claim 2,
   wherein the angle limiters include first angle limiters that protrude from coupling plates in which the through holes are respectively formed, in the same direction as a direction in which the lock protrusions protrude.

4. The electrical wire guide according to claim 2,
   wherein the angle limiters include second angle limiters that are respectively formed on inner circumferential surfaces of the through holes.

5. The electrical wire guide according to claim 1,
   wherein the link members respectively have electrical wire holders in which an electrical wire is housed and held; and
   the electrical wire holders are respectively provided with openings that are configured to house the electrical wire inserted from a direction intersecting the direction in which the link members are lined up.

6. The electrical wire guide according to claim 5,
   wherein the electrical wire holders are hook-shaped and made of rod-shaped members.

* * * * *